United States Patent [19]
Saito et al.

[11] Patent Number: 4,578,327
[45] Date of Patent: Mar. 25, 1986

[54] ELECTRIC CELLS USING FLUORINATED GRAPHITE AS ACTIVE MATERIAL OF POSITIVE ELECTRODE

[75] Inventors: Shigeakira Saito; Masayuki Fukuoka, both of Shizuoka, Japan

[73] Assignee: Asahikasei Kabushiki Kaisha, Tokyo, Japan

[21] Appl. No.: 763,075

[22] Filed: Aug. 5, 1985

Related U.S. Application Data

[63] Continuation of Ser. No. 585,876, Mar. 2, 1984, abandoned.

[30] Foreign Application Priority Data

Apr. 5, 1983 [JP] Japan .................................. 58-58644
Jun. 9, 1983 [JP] Japan .................................. 58-101701

[51] Int. Cl.$^4$ ............................................. H01M 6/14
[52] U.S. Cl. .................................. 429/194; 429/212; 429/218; 429/50; 29/623.1
[58] Field of Search ............... 429/194, 196, 212, 218, 429/50; 29/623.1

[56] References Cited

U.S. PATENT DOCUMENTS

| | | | |
|---|---|---|---|
| 3,514,337 | 5/1970 | Braeuer et al. ..................... | 429/194 |
| 3,536,532 | 10/1970 | Watanabe et al. .................. | 429/194 |
| 3,700,502 | 10/1972 | Watanabe et al. .................. | 429/218 |
| 3,907,593 | 9/1975 | Marincic ............................ | 429/196 |
| 3,922,174 | 11/1975 | Heller ............................... | 429/218 X |
| 3,956,018 | 5/1976 | Kozawa ............................ | 429/218 X |
| 4,105,836 | 8/1978 | Almerini .......................... | 429/194 |
| 4,247,608 | 1/1981 | Watanabe et al. ............... | 429/218 X |

OTHER PUBLICATIONS

Braeuer, K., Electrochem. Soc.-Spring Meeting (Boston)-Abstract No. 210: 495–497 (1968).
Clark, D. T. et al., J. Polymer Sci. (Polymer Chemistry Edition) 14: 2941–2967 (1976).
Kamarchik, P. et al., Accounts of Chemical Research 11: 296–300 (1978).
Lagow, R. J. et al., J. Chem. Soc. Dalton 1974: 1268–1273.
Lagow, R. J. et al., Synthesis in Inorg. and Metal-Org. Chem. 2(2): 145–149 (1972).
Mallouk, T. et al., J. Chem. Soc., Chem. Commun. 1983: 103–105.
Rudorff, W. et al., Chem. Berichte, 80 Pt. 5: 413–423 (1947).

Primary Examiner—Charles F. Lefevour
Attorney, Agent, or Firm—Pennie & Edmonds

[57] ABSTRACT

An electric cell comprising a negative electrode having a light metal as an active material, an electrolyte and a positive electrode having, as an active material, a fluorinated graphite having the formula $(C_xF)_n$ wherein x is a numerical value of about 2.0 to about 5.5 and n refers to an indefinite number of the recurring $(C_xF)$ unit and having a crystalline structure exhibiting a peak at about 13.7° to about 15.0° in terms of an angle of $2\theta$ corresponding to the diffraction at the (001) plane in an X-ray diffraction pattern, a peak in the vicinity of 685.3 eV due to the $F_{1S}$ and two peaks in the vicinity of 287.5 eV and 284.3 eV due to the $C_{1S}$ in the spectrum of electron spectroscopy of chemical analysis, two peaks in the vicinity of 1100 cm$^{-1}$ and 1240$^{-1}$ in the IR spectrum, an electric conductivity of at least about $10^{-8}$ $\Omega^{-1}$cm$^{-1}$ and a thermal stability up to 200° C. in air from the viewpoint of an X-ray diffraction pattern.

The electric cell is advantageously used in devices requiring a high voltage such as a watch, a clock, a small radio, a small computer, etc.

31 Claims, 7 Drawing Figures

ELECTRIC CELLS USING FLUORINATED GRAPHITE AS ACTIVE MATERIAL OF POSITIVE ELECTRODE

This is a continuation of application Ser. No. 585,876, filed Mar. 2, 1984, now abandoned.

TECHNICAL FIELD

The present invention relates to an electric cell. More particularly, it relates to an electric cell comprising a light metal as a negative electrode, an electrolyte and, as the active material in a positive electrode, a fluorinated graphite having the formula $(C_xF)_n$ wherein x is a numerical value of about 2.0 to about 5.5, and n refers to an indefinite number of the recurring $(C_xF)$ unit.

BACKGROUND ART

Active materials for a positive electrode of an electric cell of high performance are required to have a high electromotive force, a high open circuit voltage and, in addition, a small overvoltage on discharge, a good flat characteristic of discharge curve and a large discharge capacity per unit weight when they are used in combination with an appropriate negative electrode. Furthermore, the active materials are required to be neither decomposed nor dissolved in the electrolyte of an electric cell and have to be stable for a long period of time.

It is said that a positive electrode containing, as the active material, fluorine, which is an element having the highest positive standard potential among all the elements can provide a small-sized, light-weight electric cell having a high voltage and a high energy density, when used in combination with an appropriate negative electrode. The active materials for a positive electrode of such an electric cell which have been widely studied include fluorides of copper, nickel, silver, etc., $(CF)_n$ and $(C_2F)_n$. The copper fluoride and the nickel fluoride have a high theoretical energy density and exhibit an open circuit voltage as high as at least 3 V when used together with lithium metal as a negative electrode, but disadvantageously they are unstable in the electrolyte and the self-discharge is so remarkable that the discharge capacity is greatly decreased in a few days. Further, the overvoltage on discharge is large and the uniformity of discharge voltage is poor. Thus, the cells using the copper fluoride and the nickel fluoride as the active material for a positive electrode have not yet been of practical use. On the other hand, $(CF)_n$ and $(C_2F)_n$ are excellent active materials for a positive-electrode which have an open circuit voltage as high as 3.2 V and an excellent uniformity of discharge voltage and are stable in an electrolyte for a long period of time in combination with lithium metal as a negative electrode. However, with $(CF)_n$ the overvoltage on discharge is large and a large potential drop at a high load discharge can be observed. With $(C_2F)_n$, the overvoltage on discharge is smaller than that of $(CF)_n$, and $(C_2F)_n$ is accordingly more useful, but the time for recovering the open circuit voltage after a high load discharge is long. Thus, until now, optimum active materials for a positive electrode were still sought.

The present inventors have therefore made extensive studies to develop active materials of a fluorine type for the positive electrode of an electric cell having high performance and, as a result, have found active materials for the positive electrode which not only almost perfectly satisfy the above described requisites for the positive-electrode active materials of an electric cell of high performance but also exceed the conventional active materials for the positive-electrode in various performances for the electric cell.

DISCLOSURE

The present invention relates to an electric cell comprising a negative electrode having a light metal as an active material, an electrolyte and a positive electrode having, as an active material, a fluorinated graphite represented by the formula $(C_xF)_n$ wherein x is a numerical value of about 2.0 to about 5.5 and n refers to an indefinite number of the recurring $(C_xF)$ unit and having a crystalline structure exhibiting a peak at about 13.7° to about 15.0° in terms of an angle of $2\theta$ corresponding to the diffraction at the (001) plane in a X-ray diffraction pattern, a peak in the vicinity of 685.3 eV due to the $F_{1S}$ and two peaks in the vicinity of 287.5 eV and 284.3 eV due to the $C_{1S}$ in the spectrum of electron spectroscopy of chemical analysis (hereinafter referred to as "ESCA"), two peaks in the vicinity of 1100 cm$^{-1}$ and 1240 cm$^{-1}$ in the IR spectrum, an electric conductivity of at least about $10^{-8} \Omega^{-1}$ cm$^{-1}$ and being thermally stable up to 200° C. in air from the viewpoint of a X-ray diffraction pattern.

The present invention also relates to an electric cell comprising a negative electrode having a light metal as an active material, an electrolyte and a positive electrode having, as an active material, the fluorinated graphite as described above which has been treated with an alkali or potassium iodide.

Figure 1:
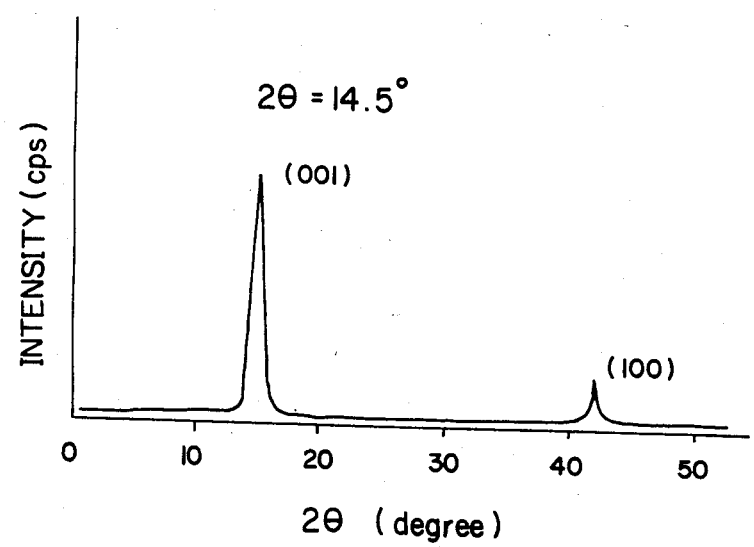
FIG. 1 shows the X-ray diffraction pattern of a fluorinated graphite of the present invention obtained by the electrolytic fluorination of an easily graphitizable carbon material.

The fluorinated graphites which can be employed as an active material for the positive electrode of an electric cell of the present invention have a chemical composition of $(C_xF)_n$ wherein x is a numerical value of about 2.0 to about 5.5 and n refers to an indefinite number of the recurring $(C_xF)$ unit; have a crystalline structure exhibiting a peak at about 13.7° to about 15.0° in terms of an angle of $2\theta$ corresponding to the diffraction at the (001) plane in the X-ray diffraction pattern which corresponds to an interlayer spacing of about 6.46 Å to about 5.90 Å, exhibit one peak in the vicinity of 685.3 eV due the $F_{1S}$ and two peaks in the vicinity of 287.5 eV and 284.3 eV due to the $C_{1S}$ in the ESCA spectrum; exhibit two peaks in the vicinity of 1100 cm$^{-1}$ and 1240 cm$^{-1}$ in the IR spectrum; have an electric conductivity of at least about $10^{-8}\Omega^{-1}$cm$^{-1}$; are thermally stable in air up to 200° C. from the viewpoint of a X-ray diffraction pattern; do not show any weight loss up to 400° C. in a nitrogen atmosphere and are black in color. Preferred fluorinated graphites have a chemical composition of $(C_xF)_n$ wherein x is a numerical value of about 2.0 to about 4.0 and n refers to an indefinite number of the recurring $(C_xF)$ unit; and have a crystalline structure having a peak at about 13.7° to about 14.8° in terms of an angle of $2\theta$ corresponding to the diffraction at the (001) plane in a X-ray diffraction pattern. FIG. 1 shows a representative example of the X-ray diffraction pattern of a typical fluorinated graphite of the present invention.

Furthermore, when the fluorinated graphite of the present invention is treated with an alkali or potassium iodide and is employed as an active material for the positive electrode of the cell, the shelf life of the cell can be remarkably prolonged and the flatness of discharge curve can be markedly improved.

The alkalis which can be employed in the present invention may be any conventional alkali reagents and include, for example, sodium hydroxide, potassium hydroxide, an aqueous ammonia solution, aliphatic primary amines such as propylamine and butylamine, aliphatic secondary amines such as isopropylamine and isoamylamine, aliphatic tertiary amines such as t-butylamine and t-amylamine, aromatic primary amines such as aniline and benzylamine, aromatic secondary amines such as N-methylbenzylamine and N-ethylbenzylamine, aromatic tertiary amines such as benzyldiethylamine and heterocyclic amines such as pyridine and pyridazine. Among these alkalis, sodium hydroxide is especially preferred.

It is preferred that the alkali is employed as the aqueous solution having a concentration of the alkali of about 0.5% by weight to about 5% by weight. In the case of a concentration of the alkali of less than about 0.5% by weight, the effect of treating the fluorinated graphite with the alkali cannot satisfactorily be exhibited. On the other hand, in the case of a concentration of the alkali of more than about 5% by weight, the diffusion of fluorine into the solution can be disadvantageously and unnecessarily caused. When potassium iodide is employed, it is preferred to employ an aqueous solution of potassium iodide of about 0.01N to about 0.1N. In the case of using an aqueous solution of potassium iodide less than about 0.01N, the effect of treating the fluorinated graphite therewith cannot satisfactorily exhibited. On the other hand, in the case of using an aqueous solution of potassium iodide more than about 0.1N, the diffusion of fluorine into the solution can be disadvantageously caused. Among these aqueous solutions of the alkalis and potassium iodide it is preferred to employ an aqueous solution of sodium hydroxide having a concentration of about 0.5% by weight to about 5% by weight.

The treatment can be carried out by charging the fluorinated graphite of the present invention into the aqueous solution of the alkali or potassium iodide and, stirring the mixture at room temperature (in the range of about 15° C. to about 35° C.) for a time in the range of about 5 minutes to about 2 hours and then subjecting to filtration. The fluorinated graphite thus separated is thoroughly washed with water and dried in vacuum.

The fluorinated graphite which can be employed in the present invention can be produced by subjecting a carbon material to electrolysis in hydrogen fluoride.

Exemplary carbon materials which can be employed in the present invention are easily graphitizable carbons and include petroleum coke, pitch, meso-phase pitch, calcined vinyl chloride, carbon whisker, graphites obtained by heat treatment thereof and natural graphite. Among these carbon materials, meso-phase pitch and natural graphite are preferred, and heat-treated meso-phase pitch is more preferred.

The apparatus for producing the fluorinated graphite of the present invention may be typically made of copper, nickel, silver, stainless steel or any combination thereof and may have an anode and a cathode made of nickel, stainless steel or copper.

The electrolytic fluorination according to the present invention is typically conducted in hydrogen fluoride containing an electrically conductive material such as water and a metal salt including sodium fluoride, potassium fluoride, calcium fluoride and magnesium fluoride at a voltage of about 6.5 V to about 10 V at a temperature of −40° C. to about 100° C. in an atmosphere of dried air treated with a dehydrating agent such as calcium chloride, potassium hydroxide and sulfuric acid or an inert gas such as nitrogen, argon and helium. When water is employed as the electrically conductive agent, it is preferred that the weight ratio of water to hydrogen fluoride is maintained in the range of about 0.0001 to about 0.01. On the other hand, when the metal fluorides are employed as the electrically conductive agent, in order to maintain an appropriate electrical conductivity and to prevent excess corrosion of the electrodes, the amount of the metal fluorides employed is preferably in the range of about 1% by weight to about 20% by weight based on the weight of the hydrogen fluoride.

The electrolytic fluorination proceeds at the anode. Accordingly, it is preferred that the carbon material is disposed on the anode or in the vicinity of the anode. As an exemplary method, the carbon material is uniformly spread on the anode and fixed with a net of polytetrafluoroethylene. In an electrolytic vessel are charged the carbon material and hydrogen fluoride containing an electrically conductive agent, and an electric current is applied typically in a total quantity of electricity in the range of about $2 \times 10^3$ coulombs to about $1 \times 10^6$ coulombs per gram of the carbon material.

The positive electrode in the electric cell of the present invention may be prepared as follows. The fine powder of the fluorinated graphite of the present invention is thoroughly mixed with a binder such as powder or particles of polyethylene, a fluoropolymer such as polytetrafluoroethylene, a SBR resin and an expanded graphite, if necessary or if desired, together with an electrically conductive agent such as carbon powder and acetylene black in order to increase a short-circuit current. The mixture obtained is molded into a predetermined shape to form a positive electrode. The amount of the binder employed is typically in the range of about 1% by weight to about 20% by weight based on the weight of active material. In the case where the amount of the binder employed is less than 1% by weight, the binding effect is not satisfactorily exhibited. On the other hand, in the case where the amount of binder is more than 20% by weight, the volume fraction of an active material is decreased, and thus a decrease in capacity of an electric cell is disadvantageously caused.

The active materials of a negative electrode of a cell which can be employed in the present invention are light metals or light metal alloys and include alkali metals such as lithium, sodium and potassium, alkaline earth metals such as calcium and magnesium, aluminum, any mixtures thereof, and alloys containing any of these metals as a main component. Among these metals, the alkali metals having a low negative electrode potential are preferred, with lithium the more preferred.

The electrolyte which can be employed in the electric cell of the present invention depends upon the negative electrode metal emloyed and may be either of an aprotic organic solvent system or a protonic solvent system. Exemplary aprotic organic solvents for the electrolyte include γ-butyrolactone, propylene carbonate, ethylene carbonate, dimethylformamide, dimethyl sulfoxide, tetrahydrofuran, dimethyl sulfite, 1,2-dimethoxyethane, methyl formate and acetonitrile. Exemplary protonic solvents for the electrolyte include water, ethylene glycol, glycerin, monochloroacetic acid and dichloroacetic acid. The concentration of the electrolyte is not critical and may be chosen so as to give a high electrical conductivity.

The solute of the electrolyte which can be employed in the present invention include various compounds such as $LiClO_4$, $LiBF_4$, $KPF_6$, $LiAlCl_4$ and any mixtures thereof.

In combination with lithium as the active material for the negative electrode, the electric cell of the present invention exhibits, as its characteristic feature, an open circuit voltage of from about 3.6 V to about 4.0 V and a discharge voltage at a constant-resistance of 2.6 KΩ of about 3.3 V which is higher than those of conventional electric cells using, for example, $(CF)_n$ and $(C_2F)_n$, respectively, as the active material for the positive electrode and, in addition, is excellent in uniformity of discharge voltage and exhibits a utility of about 100% and good stability for a long period of time. In this connection, the term "utility" means the ratio of an experimental discharge capacity to a theoretical capacity calculated from the amount of the active material for the negative electrode. Thus, the electric cell of the present invention is advantageously used in devices requiring a high voltage such as a watch, a clock, a small radio and a small computer.

The present invention is hereunder described in greater detail by reference to working examples, to which the scope of the present invention is by no means limited.

EXAMPLE 1

The electrolytic vessel employed was a cylinder made of copper-nickel alloy having an internal volume of 660 ml equipped with a reflux condenser. An anode and a cathode employed as electrodes were both nickel plates having a thickness of 0.5 mm; the electrode distance was 0.5 cm and their effective area was 76 cm². On the anode 1.0 g of pitch type graphite monofilaments having a diameter of 10 μm whose X-ray spacing was 3.36 Å and a length of 5 cm (trade mark "Thornel P-55S" manufactured by Union Carbide Corporation, U.S.A.) which had been heat-treated at 2720° C. for 10 minutes in an argon atmosphere was uniformly spread and fixed with a polytetrafluoroethylene thread.

Into the electrolytic vessel was charged 650 ml of hydrofluoric acid containing 1 ml of water. The electrolysis was conducted in an argon atmosphere for 8 hours under the conditions that the average current density was 1.5 A/dm², the voltage applied was 10 V and the bath temperature was −10° C. Then 100 ml of hydrofluoric acid containing 1 ml of water was additionally charged into the electrolytic vessel and the electrolysis was conducted further for 16 hours under the same conditions as described above. The total quantity of electricity applied was $4 \times 10^4$ coulombs per gram of the carbon monofilaments.

The product thus obtained was black in color; had a composition of $(C_{2.8}F)_n$ according to the elemental analysis; a crystalline structure exhibiting a peak at 14.5° in terms of an angle of $2\theta$ corresponding to the diffraction at the (001) plane in a X-ray diffraction pattern which corresponded to an interlayer spacing of 6.10 Å; exhibited one peak at 1100 cm$^{-1}$ and another peak at 1200 cm$^{-1}$ in the IR spectrum; one peak at 685.1 eV due to the $F_{1S}$ and two peaks at 287.5 eV and 284.3 eV due to the $C_{1S}$ in the ESCA spectrum; and was stable up to 200° C. in air from the viewpoint of a X-ray diffraction pattern and did not show weight loss up to 400° C. in a nitrogen atmosphere. The electric conductivity was $0.5 \Omega^{-1} cm^{-1}$.

Figure 2:
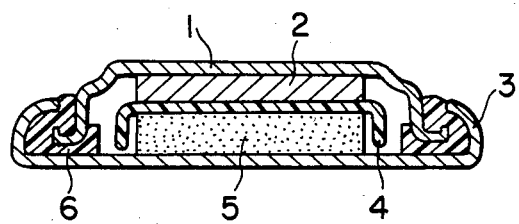
FIG. 2 is a cross-sectional view of a typical button cell of the present invention employed in the performance test.

The fluorinated pitch graphite monofilaments thus obtained were finely and sufficiently pulverized in a mortar, and 1 g of the powder was mixed with 0.2 g of polytetrafluoroethylene powder and thoroughly kneaded. The mixture was press-molded into a disc having a diameter of 16 mm and a thickness of 1 mm to form a positive electrode. As a negative electrode was employed a disc sheet having a diameter of 16 mm and a thickness of 0.35 mm. A typical button cell of the present invention as shown in FIG. 2 was prepared. As shown in FIG. 2, the electric cell comprised a stainless steel container 3 to the bottom of which a positive electrode disc 5 was adhered with an electrically conductive adhesive, a stainless steel inverted cup 1 inside which the negative electrode disc 2 of lithium was press-adhered and a separator 4 of a polypropylene unwoven fabric which was disposed between the positive electrode disc 5 and the negative electrode disc 2. After a γ-butyrolactone solution containing 1 mol/liter of $LiBF_4$ was charged in the container 3 as an electrolyte, the container 1 was sealed within the open end of the container 3 by means of a plastic insulating gasket 6. The inverted cup 1 and the container 3 acted as the negative electrode terminal and the positive electrode terminal, respectively.

The open circuit voltage at 25° C. of the electric cell thus prepared on a day after its preparation was 3.9 V which was higher than those of 3.2 V and 3.5 V of the electric cells employing $(CF)_n$ and $(C_2F)_n$, respectively, as active materials for the positive electrode. Thus it is found that the fluorinated graphite of this invention is excellent as an active material for a positive electrode.

Figure 3:
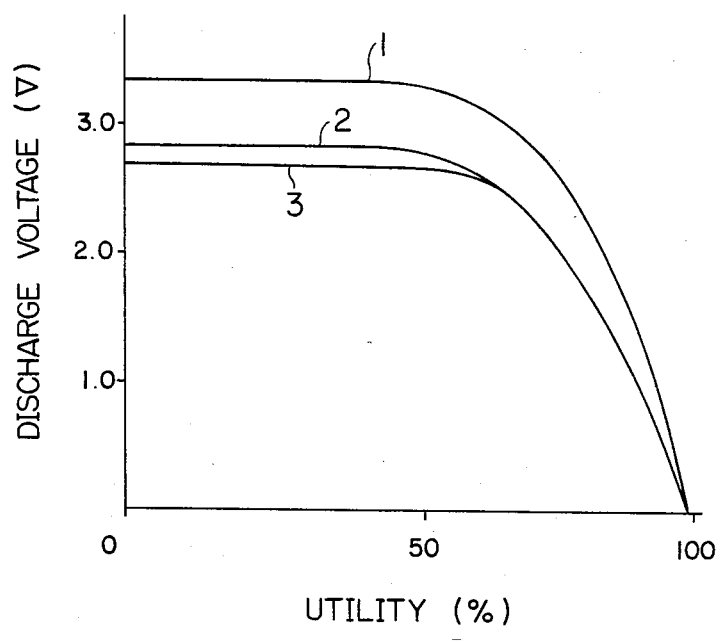
FIG. 3 is a group of curves showing characteristic discharge profiles of the electric cells using a fluorinated graphite of the present invention, $(CF)_n$ and $(C_2F)_n$, respectively, as the active material for the positive electrode.

The discharge curves of the electric cells at 25° C. at a constant-resistance of 2.6 KΩ immediately after their preparation are shown in FIG. 3 where the curves 1, 2 and 3 are the discharge curves of the electric cells employing the material of the present invention, $(C_2F)_n$ and (CF)$_n$, respectively, as an active material for the positive electrode. As is clear from this result, the electric cell employing the fluorinated graphite of the present invention as an active material for the positive electrode is much higher in discharge voltage than those employing (CF)$_n$ and (C$_2$F)$_n$, respectively, as an active material for the positive electrode. The good discharge characteristics of the electric cell of the present invention may be due to the phenomenon that in the case of the electric cell of the present invention, lithium ion as the discharge element can be more easily diffused into the interlayers of the fluorinated graphite, than in the case of the electric cells employing (CF)$_n$ and (C$_2$F)$_n$, respectively, as an active material for the positive electrode. Furthermore, the electric cell of the present invention has a utility of about 100% and an excellent uniformity of discharge voltage.

As described above, electric cells of higher performance can be obtained by employing the fluorinated graphite of the present invention as an active material for the positive electrode.

EXAMPLE 2

Fluorinated pitch graphite monofilaments having a composition of (C$_{2.8}$F)$_n$; a crystalline structure exhibiting a peak at 14.5° ($\theta$) corresponding to the diffraction at the (001) plane in a X-ray diffraction pattern; one peak at 1100 cm$^{-1}$ and another peak at 1200 cm$^{-1}$ in the IR spectrum; one peak at 685.1 eV due to the F$_{1S}$ and two peaks at 287.5 eV and 284.3 eV due to the C$_{1S}$ in the ESCA spectrum and being thermally stable up to 200° C. in air from the viewpoint of a X-ray diffraction pattern, were produced by the electrolytic fluorination in the same manner as in Example 1 except that the pitch graphite monofilaments not subjected to the heat treatment were employed. Then the resulting monofilaments were finely and sufficiently pulverized in a mortar, and 1 g samples of the powder thus obtained were immersed in 10 ml of a 1% by weight aqueous sodium hydroxide solution, 10 ml of a 2% by weight aqueous ammonia solution, 10 ml of a 0.5% by weight aqueous pyridine solution and 10 ml of a 0.05N aqueous potassium iodide solution, respectively, and the mixtures thus obtained were stirred at 25° C. for 30 minutes. In the case of the aqueous potassium iodide solution, the mixture was stirred in a dark place at 5° C. for 30 minutes and then was left to stand in the dark place at 5° C. for one hour.

The respective samples, immersed in the aqueous sodium hydroxide solution, the aqueous ammonia solution and the aqueous pyridine solution were filtered off and sufficiently washed with ion-exchanged water until the filtrate became neutral, and then dried in vacuum. Similarly, the sample treated with potassium iodide was filtered off and sufficiently washed until potassium iodide could not be detected in the filtrate, and then dried in vacuum.

One gram of each kind of the four active materials for the positive electrode as obtained above and one untreated active material for the positive electrode which was the same fluorinated graphite as obtained in Example 1, was mixed with 0.2 g of polytetrafluoro-ehtylene powder, and the mixture was thoroughly kneaded and press-molded to give a disc having a diameter of 16 mm and a thickness of 1 mm, resulting in five kinds of the positive electrodes of electric cells. In the same manner as in Example 1, five button cells were prepared by using the positive electrode as obtained above.

Figure 4:
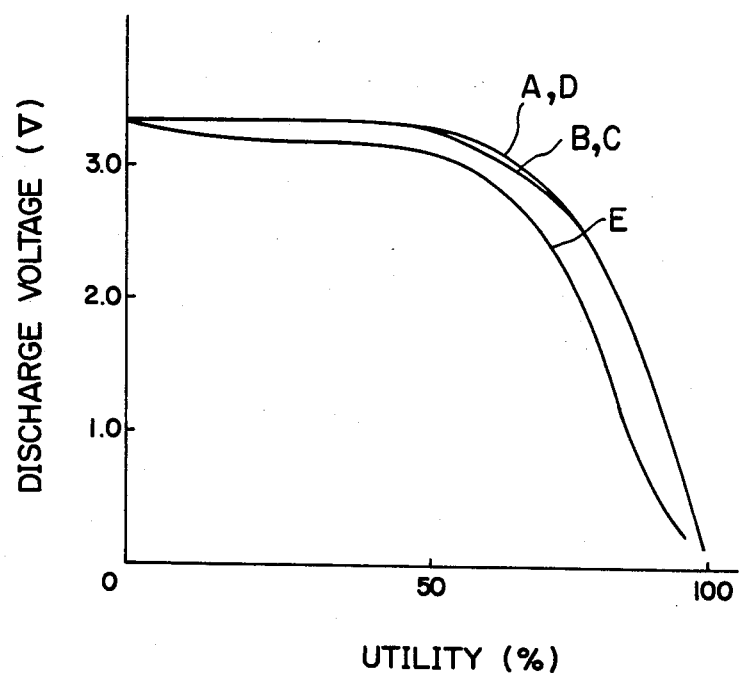
FIG. 4 is a group of curves showing characteristic discharge profiles of the electric cells using the fluorinated graphites treated with a variety of alkalis or potassium iodide according to the present invention as a positive-electrode active material.

FIG. 4 are discharge curves of the electric cells at 25° C. at a constant-resistance of 2.6 K$\Omega$ immediately after their preparation. In FIG. 4, A, B, C and D show the discharge curves of the electric cells employing the fluorinated graphites having been treated with the 1% by weight aqueous sodium hydroxide solution, the 2% by weight aqueous ammonia solution, the 0.5% by weight aqueous pyridine solution and the 0.05N aqueous potassium iodide solution, respectively, as an active material for the positive electrode. For comparison, E shows the discharge curve of the electric cell employing the untreated fluorinated graphite as an active material for the positive electrode.

Figure 5:
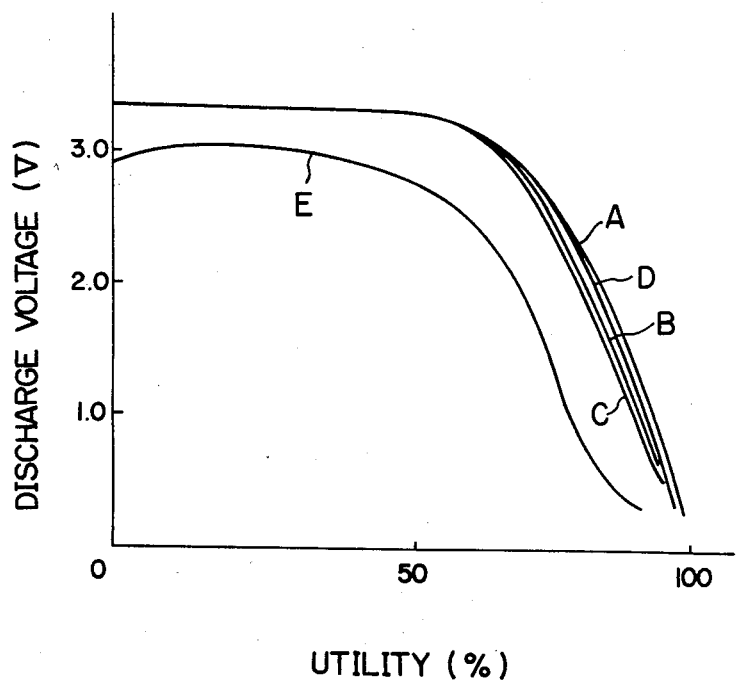
FIG. 5 is a group of curves showing characteristic discharge profiles of the same electric cells as shown in FIG. 4 after their storage at 60° C. for one month.

FIG. 5 shows discharge curves of the same five electric cells as described above at 25° C. at a constant-resistance of 2.6 K$\Omega$ after their storage at 60° C. for one month.

EXAMPLE 3

Three electric cells were prepared in the same manner as in Example 1 using the fluorinated graphites having a composition of (C$_{2.5}$F)$_n$, (C$_{3.5}$F)$_n$ and (C$_{5.0}$F)$_n$, respectively, obtained in the same manner as in Example 1 as an active material of the positive electrode. The discharge characteristics of the electric cells are shown in Table 1.

TABLE 1

| Run No. | Composition of Fluorinated Graphite | 2$\theta$ of Fluorinated Graphite in X-ray Diffraction Pattern (degree) | Open Circuit Voltage (V) |
|---|---|---|---|
| F | (C$_{2.5}$F)$_n$ | 14.1 | 3.7 |
| G | (C$_{3.5}$F)$_n$ | 14.7 | 3.7 |
| H | (C$_{5.0}$F)$_n$ | 14.9 | 3.6 |

All the fluorinated graphites employed exhibited one peak in the vicinity of 1100 cm$^{-1}$ and another peak in the vicinity of 1240 cm$^{-1}$ in the IR spectra; one peak in the vicinity of 685.3 eV due to the F$_{1S}$ and two peaks in the vicinity of 287.5 eV and 284.3 eV due to the C$_{1S}$ in the ESCA spectra and were thermally stable in air up to 200° C. from the viewpoint of the X-ray diffraction.

Figure 6:
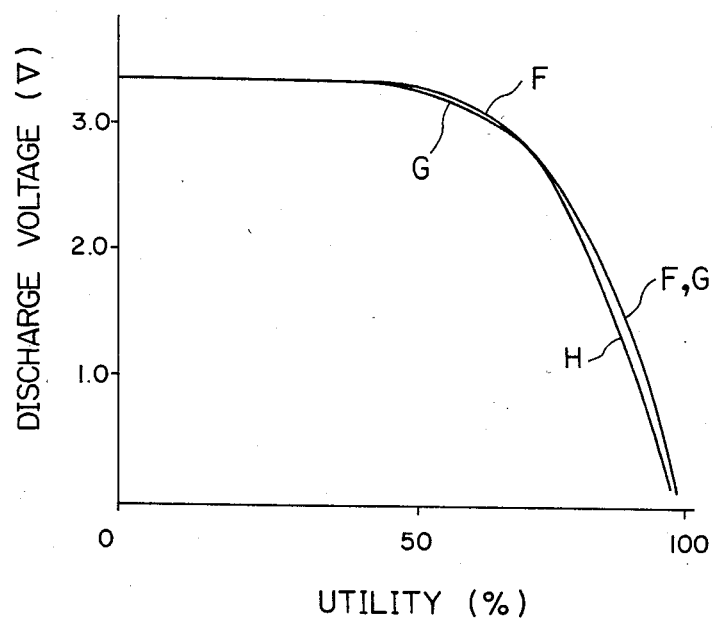
FIG. 6 is a group of curves showing characteristic discharge profiles of the electric cells using the fluorinated graphites having the formulae $(C_{2.5}F)_n$, $(C_{3.5}F)_n$ and $(C_{5.0}F)_n$, respectively, as an active material of the positive electrode.

These three electric cells were discharged at a constant-resistance of 2.6 K$\Omega$ and the results are shown in FIG. 6.

EXAMPLE 4

Three electric cells were prepared in the same manner as in Example 1 using the fluorinated graphites having a crystalline structure exhibiting a peak at 14.0°, 14.8° and 15.0°, respectively, in terms of an angle of 2$\theta$ corresponding to the diffraction at the (001) plane in the X-ray diffraction pattern, obtained in the same manner as in Example 1 as an active material of the positive electrode. The discharge characteristics of the electric cells are shown in Table 2.

TABLE 2

| Run No. | Composition of Fluorinated Graphite | 2$\theta$ of Fluorinated Graphite in X-ray Diffraction Pattern (degree) | Open Circuit Voltage (V) |
|---|---|---|---|
| I | (C$_{2.3}$F)$_n$ | 14.0 | 3.7 |
| J | (C$_{3.6}$F)$_n$ | 14.8 | 3.7 |
| K | (C$_{5.5}$F)$_n$ | 15.0 | 3.6 |

All the fluorinated graphites employed exhibited one peak in the vicinity of 1100 cm$^{-1}$ and another peak in the vicinity of 1240 cm$^{-1}$ in the IR spectra; one peak in the vicinity of 685.3 eV due to the F$_{1S}$ and two peaks in the vicinity of 287.5 eV and 284.3 eV due to the C$_{1S}$ in the ESCA spectra and were thermally stable in air up to 200° C. from the viewpoint of a X-ray diffraction.

Figure 7:
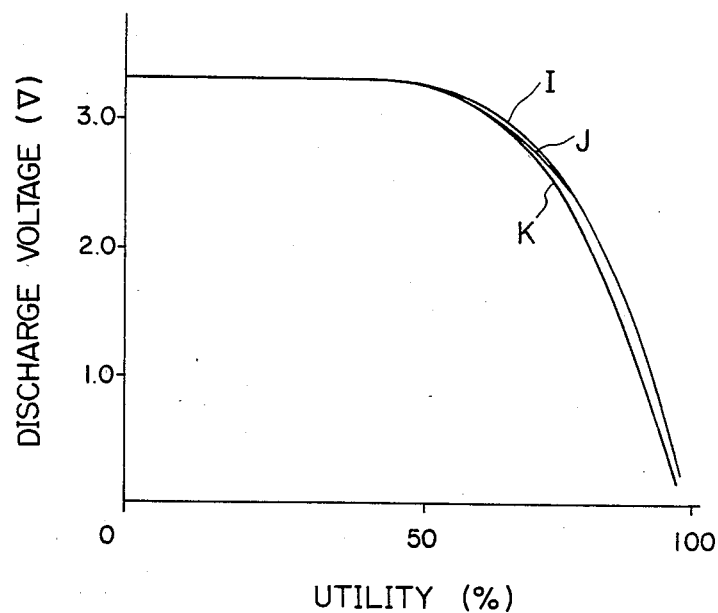
FIG. 7 is a group of curves showing characteristic discharge profiles of the electric cells using the fluorinated graphites having a crystalline structure exhibiting peaks at 14.0°, 14.8° and 15.0°, respectively, in terms of an angle of $2\theta$ corresponding to the diffraction at the (001) plane in the X-ray diffraction pattern as an active material of the positive electrode.

These three electric cells were discharged at a constant-resistance of 2.6 KΩ and the results are shown in FIG. 7.

While the invention has been described in detail and with reference to specific embodiments thereof, it will be apparent to one skilled in the art that various changes and modifications can be made therein without departing from the spirit and scope thereof.

We claim:

1. An electric cell comprising a negative electrode having a light metal as an active material, an electrolyte which is not reduced by current flowing through the cell, and a positive electrode having, as an active material, a treated fluorinated graphite having the formula (C$_x$F)$_n$ wherein x is a numerical value of about 2.0 to about 5.5 and n refers to an indefinite number of the recurring (C$_x$F) units and having a crystalline structure exhibiting a peak at about 13.7° to about 15.0° in terms of an angle of 2θ corresponding to the diffraction at the (001) plane in a X-ray diffraction pattern, a peak in the vicinity of 685.3 eV due to the F$_{1S}$ and two peaks in the vicinity of 287.5 eV and 284.3 eV due to the C$_{1S}$ in the spectrum of electron spectroscopy of chemical analysis, two peaks in the vicinity of 1100 cm$^{-1}$ and 1240 cm$^{-1}$ in the IR spectrum, an electric conductivity of at least about 10$^{-8}$Ω$^{-1}$cm$^{-1}$ and a thermal stability up to 200° C. in air from the viewpoint of a X-ray diffraction pattern, said graphite treated with an alkali or potassium iodide solution prior to insertion of said graphite into said cell so as to increase the shelf life of the cell and improve the flatness of the cell discharge curve.

2. The electric cell of claim 1, wherein the fluorinated graphite has a chemical composition of the formula (C$_x$F)$_n$ wherein x is a numerical value of about 2.0 to about 4.0 and n refers to an indefinite number of the recurring (C$_x$F) unit and having a crystalline structure exhibiting a peak at about 13.7° to about 14.8° in terms of an angle of 2θ corresponding to the diffraction at (001) plane in a X-ray diffraction pattern.

3. The electric cell of claim 2, wherein the fluorinated graphite is obtained by the electrolytic fluorination of a carbon material in hydrogen fluoride.

4. The electric cell of claim 3, wherein the carbon material is an easily graphitizable carbon material.

5. The electric cell of claim 4, wherein the easily graphitizable carbon material is petroleum coke, pitch, meso-phase pitch, calcined vinyl chloride, carbon whisker, graphite obtained by the heat treatment thereof or natural graphite.

6. The electric cell of claim 5, wherein the easily graphitizable carbon material is meso-phase pitch.

7. The electric cell of claim 5, wherein the easily graphitizable carbon material is natural graphite.

8. The electric cell of claim 2, wherein the light metal as an active material of the negative electrode is an alkali metal, alkaline earth metal, aluminum or an alloy containing as it main component any of these metals.

9. The electric cell of claim 8, wherein the alkali metal is lithium, sodium or potassium.

10. The electric cell of claim 2, wherein the positive electrode additionally contains a binder.

11. The electric cell of claim 2, wherein the positive electrode further contains an electrically conductive agent.

12. The electric cell of claim 2, wherein the electrolyte is of an aprotic organic solvent system.

13. The electric cell of claim 2, wherein the electrolyte is of a protonic solvent system.

14. The electric cell of claim 1, wherein the fluorinated graphite is obtained by the electrolytic fluorination of a carbon material in hydrogen fluoride.

15. The electric cell of claim 14, wherein the carbon material is an easily grahitizable carbon material.

16. The electric cell of claim 15, wherein the easily graphitizable carbon material is petroleum coke, pitch, meso-phase pitch, calcined vinyl chloride, carbon whisker, graphite obtained by the heat treatment thereof or natural graphite.

17. The electric cell of claim 16, wherein the easily graphitizable carbon material is meso-phase pitch.

18. The electric cell of claim 16, wherein the easily graphitizable carbon material is natural graphite.

19. The electric cell of claim 1, wherein the potassium iodide is an aqueous solution of potassium iodide in the range of about 0.01N to about 0.1N.

20. The electric cell of claim 1, wherein the light metal as an active material of the negative electrode is an alkali metal, alkaline earth metal, aluminum or an alloy containing as it main component any of these metals.

21. The electric cell of claim 20, wherein the alkali metal is lithium, sodium or potassium.

22. The electric cell of claim 1, wherein the positive electrode additionally contains a binder.

23. The electric cell of claim 1, wherein the positive electrode further contains an electrically conductive agent.

24. The electric cell of claim 1, wherein the electrolyte is of an aprotic organic solvent system.

25. The electric cell of claim 1, wherein the electrolyte is of a protonic solvent system.

26. A method for increasing the shelf life of an electric cell utilizing fluorinated graphite having the formula (C$_x$F)$_n$ wherein x is a numerical value of about 2.0 to about 5.5 and n refers to an indefinite number of the recurring (C$_x$F) unit as the active material for the positive electrode and improving the flatness of the cell discharge curve, comprising treating said fluorinated graphite with potassium iodide solution prior to inserting said fluorinated graphite in said cell.

27. The method of claim 26 wherein the alkali or potassium iodide is in aqueous solution.

28. The method of claim 27 wherein the concentration in aqueous solution is from 0.5% to 5% by weight in alkali or from 0.01N to 0.1N in potassium iodide.

29. A method for increasing the shelf life and improving the flatness of the cell discharge curve of an electric cell having a positive electrode of fluorinated graphite, a negative electrode of a light metal and an electrolyte which is not reduced by current flowing through the cell, said method comprising the steps of:
   (a) preparing a treated fluorinated gaphite material by
   (i) adding a fluorinated graphite to an aqueous solution of from about 0.01 to 0.1N potassium iodide to form a mixture;
   (ii) stirring the resulting mixture at room temperature for about 5 minutes to about 2 hours;
   (iii) filtering the stirred mixture to separate the fluorinated graphite;

(iv) washing the separated fluorinated graphite with water; and
(v) vacuum drying the washed fluorinated graphite to obtain a treated fluorinated graphite having the formula $(C_xF)_n$ wherein x is a numerical value of about 2.0 to about 5.5 and n refers to an indefinite number of the recurring $(C_xF)$ units and having a crystalline structure exhibiting a peak at about 13.7° to about 15.0° in terms of an angle of $2\theta$ corresponding to the diffraction at the (001) plane in a X-ray diffraction pattern, a peak in the vicinity of 685.3 eV due to the $F_{1S}$ and two peaks in the vicinity of 287.5 eV and 284.3 eV due to the $C_{1S}$ in the spectrum of electron spectroscopy of chemical analysis, two peaks in the vicinity of 1100 cm$^{-1}$ and 1240 cm$^{-1}$ in the IR spectrum, an electric conductivity of at least about $10^{-8} \Omega^{-1}$ cm$^{-1}$ and a thermal stability up to 200° C. in air from the viewpoint of a X-ray diffraction pattern; and (b) utilizing the treated fluorinated graphite as the positive electrode of the cell.

30. The method of claim 29 wherein the light metal of the negative electrode is lithium, sodium, potassium, calcium, magnesium, aluminum or mixtures thereof.

31. The electric cell produced by the method of claim 26.

* * * * *

UNITED STATES PATENT AND TRADEMARK OFFICE
CERTIFICATE OF CORRECTION

PATENT NO. :   4,578,327
DATED      :   March 25, 1986
INVENTOR(S):   Shigeakira Saito and Masayuki Fukuoka It is certified that error appears in the above-identified patent and that said Letters Patent is hereby corrected as shown below:

Column 9, line 34, delete "an alkali or".

Column 12, line 13, "26" should be
--29--.

Signed and Sealed this

Twenty-second Day of July 1986

[SEAL]

Attest:

DONALD J. QUIGG

Attesting Officer    Commissioner of Patents and Trademarks